US012300145B2

(12) United States Patent
Qiao et al.

(10) Patent No.: US 12,300,145 B2
(45) Date of Patent: May 13, 2025

(54) GATE DRIVING CIRCUITS AND DISPLAY PANELS INCLUDING THE SAME

(71) Applicant: Shenzhen China Star Optoelectronics Semiconductor Display Technology Co., Ltd., Guangdong (CN)

(72) Inventors: Zhenyang Qiao, Guangdong (CN); Liuqi Zhang, Guangdong (CN); Baixiang Han, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 1 day.

(21) Appl. No.: 18/457,552

(22) Filed: Aug. 29, 2023

(65) Prior Publication Data

US 2024/0379042 A1 Nov. 14, 2024

(30) Foreign Application Priority Data

May 8, 2023 (CN) ......................... 202310516335.8

(51) Int. Cl.
*G09G 3/20* (2006.01)

(52) U.S. Cl.
CPC ... *G09G 3/2092* (2013.01); *G09G 2310/0267* (2013.01); *G09G 2330/12* (2013.01)

(58) Field of Classification Search
CPC ......... G09G 3/2092; G09G 2310/0267; G09G 2330/12; G09G 3/20; G09G 3/3677;
(Continued)

(56) References Cited

U.S. PATENT DOCUMENTS

| | | | | |
|---|---|---|---|---|
| 11,177,453 B2 * | 11/2021 | Lee | ...................... | G09G 3/3225 |
| 2002/0047818 A1 * | 4/2002 | Yamamoto | ........... | G09G 3/3648 345/87 |

(Continued)

FOREIGN PATENT DOCUMENTS

| | | |
|---|---|---|
| CN | 101382714 A | 3/2009 |
| CN | 111179858 A | 5/2020 |

(Continued)

OTHER PUBLICATIONS

Japanese Office Action issued in corresponding Japanese Patent Application No. 特願2023-201998 dated Jun. 18, 2024, pp. 1-4.

*Primary Examiner* — Jose R Soto Lopez
(74) *Attorney, Agent, or Firm* — PV IP PC; Wei Te Chung

(57) ABSTRACT

A gate driving circuit includes a plurality of stages of gate driving units and at least one repair line. A $n^{th}$ stage gate driving unit in the plurality of stages of gate driving units is connected to at least a first control signal line configured to receive a $n^{th}$ stage scan signal. The $n^{th}$ stage gate driving unit is configured to output a $n^{th}$ stage pulse signal under a control of the $n^{th}$ stage scan signal. The repair line intersects with the first control signal line, and disposed in different layers from the first control signal line. The repair line is configured to transmit a $m^{th}$ stage scan signal, both of n and m are positive integers greater than 0, and n is greater than or less than m.

19 Claims, 3 Drawing Sheets

(58) Field of Classification Search

CPC ............... G09G 3/3266; G09G 3/3674; G09G 2310/0202; G09G 2310/0243; G09G 2310/0264; G09G 2310/0278

See application file for complete search history.

(56) References Cited

U.S. PATENT DOCUMENTS

| | | | | |
|---|---|---|---|---|
| 2006/0001638 | A1* | 1/2006 | Jeon | G09G 3/3677 345/100 |
| 2006/0056267 | A1* | 3/2006 | Kim | G09G 3/3677 365/230.06 |
| 2007/0216634 | A1* | 9/2007 | Kim | G11C 19/28 345/100 |
| 2010/0001941 | A1* | 1/2010 | Shin | G09G 3/3677 345/98 |
| 2010/0171726 | A1* | 7/2010 | Chen | G09G 3/3677 345/206 |
| 2012/0092579 | A1* | 4/2012 | Liu | G09G 3/20 349/55 |
| 2013/0050157 | A1* | 2/2013 | Baek | G09G 3/2092 345/204 |
| 2013/0147773 | A1* | 6/2013 | Jin | G09G 3/3266 345/204 |
| 2013/0335392 | A1* | 12/2013 | Cho | G11C 19/28 327/108 |
| 2014/0055436 | A1* | 2/2014 | Han | H03K 17/687 327/109 |
| 2015/0116008 | A1* | 4/2015 | Jang | H03K 17/161 327/109 |
| 2015/0123884 | A1* | 5/2015 | Kim | G09G 3/3208 345/82 |
| 2015/0379908 | A1* | 12/2015 | Kim | G09G 3/006 345/84 |
| 2016/0203782 | A1* | 7/2016 | Xie | H10K 59/00 377/64 |
| 2016/0358534 | A1* | 12/2016 | Kim | G09G 3/20 |
| 2017/0004760 | A1* | 1/2017 | Jang | G09G 3/3677 |
| 2017/0200409 | A1* | 7/2017 | Zhao | G09G 3/20 |
| 2017/0343868 | A1* | 11/2017 | Kim | G02F 1/1368 |
| 2018/0045983 | A1* | 2/2018 | Kim | G02F 1/29 |
| 2019/0019444 | A1* | 1/2019 | Jo | H10K 59/122 |
| 2019/0056811 | A1* | 2/2019 | Wang | G06F 3/041 |
| 2019/0057658 | A1* | 2/2019 | Nie | G09G 3/3266 |
| 2020/0035317 | A1* | 1/2020 | Feng | G09G 3/3266 |
| 2020/0380898 | A1* | 12/2020 | Jung | G09G 3/3674 |
| 2021/0335195 | A1* | 10/2021 | Xian | G09G 3/3674 |
| 2022/0037451 | A1* | 2/2022 | Kwak | H10K 59/873 |
| 2022/0076599 | A1* | 3/2022 | Akyol | G09G 3/006 |
| 2022/0077273 | A1* | 3/2022 | Qing | H01L 27/0248 |
| 2022/0406260 | A1* | 12/2022 | Pang | G09G 3/3233 |
| 2023/0200193 | A1* | 6/2023 | Kang | G09G 3/3233 438/4 |
| 2024/0029639 | A1* | 1/2024 | Kim | G09G 3/3233 |
| 2024/0046845 | A1* | 2/2024 | Chen | G09G 3/2092 |

FOREIGN PATENT DOCUMENTS

| | | | |
|---|---|---|---|
| CN | 111883049 | A | 11/2020 |
| JP | 2007034305 | A | 2/2007 |
| JP | 2021502586 | A | 1/2021 |
| JP | 2021170093 | A | 10/2021 |

* cited by examiner

GATE DRIVING CIRCUITS AND DISPLAY PANELS INCLUDING THE SAME

CROSS-REFERENCE TO RELATED DISCLOSURE

This disclosure claims the priority to and the benefit of Chinese Patent Disclosure No. 202310516335.8 filed on May 8, 2023, the disclosure of which is incorporated herein by reference in its entirety.

TECHNICAL FIELD

The disclosure relates to the field of display, in particular, to gate driving circuits and display panels including the same.

BACKGROUND

Gate driver on array (GOA) is the driving technology that integrates a gate driving circuit on an array substrate of a display panel to achieve the row by row scan. The above-mentioned driving technology can omit a gate integrated circuit (IC) chip, which has the advantages of reducing production costs and realizing a narrow frame design of the display panel, and has been applied to a variety of displays.

Generally, in an internal compensation circuit of a pixel in the display panel, in order to achieve the purpose of compensation and adjustment of the brightness of the display panel, it is necessary for the gate driving circuit to output a pulse signal with an adjustable width. Moreover, the internal compensation circuit generally requires multiple groups of scan signals output by multiple gate driving circuits, which is not conducive to the narrow frame design of the display panel. In order to simplify the design of the gate driving circuit of a pixel circuit that requires multiple groups of the scan signals, a control signal of a wide pulse gate driving circuit is provided by a scan signal output by other gate driving circuits in the display panel. However, if other gate driving circuits fail, the wide pulse gate driving circuit also fails, and the pulse signal with a preset width cannot be output, which result in low yield.

SUMMARY

Embodiments of the disclosure provide a gate driving circuit, which includes a plurality of stages of gate driving units and at least one repair line. A $n^{th}$ stage gate driving unit in the plurality of stages of gate driving units is connected to at least a first control signal line configured to receive a $n^{th}$ stage scan signal. The $n^{th}$ stage gate driving unit is configured to output a $n^{th}$ stage pulse signal under the control of the $n^{th}$ stage scan signal. The repair line intersects with the first control signal line, and the repair line and the first control signal line are disposed in different layers. The repair line is configured to transmit a $m^{th}$ stage scan signal, both of n and m are positive integers greater than 0, and n is greater than or less than m.

Embodiments of the disclosure further provide a display panel including a display area and a non-display area adjacent to the display area. The display panel includes a gate driving circuit disposed in the non-display area, and the gate driving circuit includes a plurality of stages of gate driving units and at least one repair line. A $n^{th}$ stage gate driving unit in the plurality of stages of gate driving units is connected to at least a first control signal line configured to receive a $n^{th}$ stage scan signal. The $n^{th}$ stage gate driving unit is configured to output a $n^{th}$ stage pulse signal under a control of the $n^{th}$ stage scan signal. The repair line intersects with the first control signal line, and the repair line and the first control signal line are disposed in different layers. The repair line is configured to transmit a $m^{th}$ stage scan signal, both of n and m are positive integers greater than 0, and n is greater than or less than m.

DETAILED DESCRIPTION

In combination with drawings in embodiments of the disclosure, technical solutions in the embodiments of the disclosure will be described clearly and completely. Obviously, the described embodiments are only part of the embodiments of the disclosure, not all of them. Based on the embodiments of the disclosure, all other embodiments obtained by those skilled in the art without creative effort belong to a scope of the disclosure. In addition, it should be understood that specific embodiments described herein are only used to explain and interpret the disclosure and are not used to limit the disclosure.

Moreover, terms "first", "second", or the like, in the description of the specification and the claims of the disclosure are used to distinguish different objects, not to describe a particular order. Terms "include", "have", "with", and any variation thereof, are intended to override non-exclusive inclusions.

Embodiments of the disclosure provide a gate driving circuit and a display panel, which will be described in detail below. It should be noted that the description order of the following embodiments is not used as limitations on a preferred order of the embodiments of the disclosure.

Figure 1:
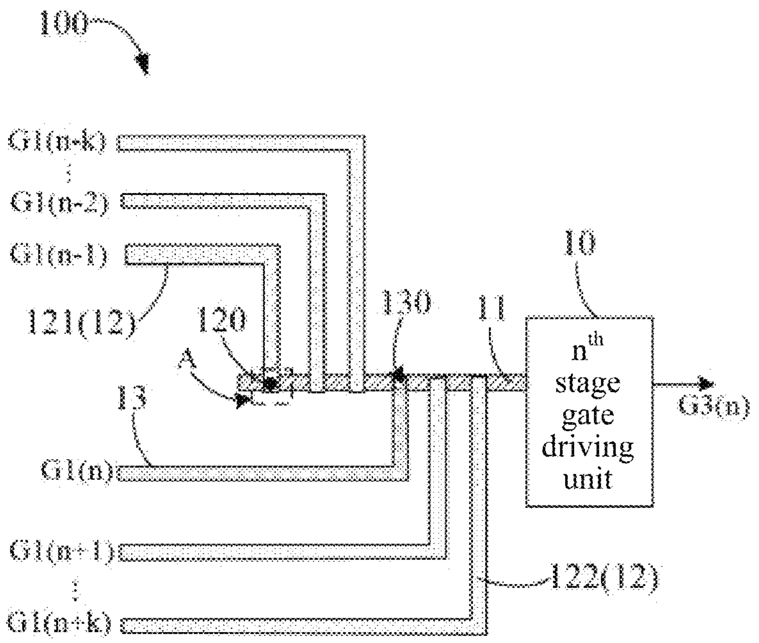
FIG. 1 is a first schematic structural diagram of a gate driving circuit according to one or more embodiments of the disclosure.

Referring to FIG. 1, it is a first schematic structural diagram of a gate driving circuit according to some embodiments of the disclosure. A gate driving circuit 100 includes multiple stages of gate driving units and at least one repair line 12. A $n^{th}$ stage gate driving unit 10 in the multiple stages of gate driving units is connected to at least a first control signal line 11. The first control signal line 11 is configured to receive a $n^{th}$ stage scan signal G1(n). The $n^{th}$ stage gate driving unit 10 is configured to output a $n^{th}$ stage pulse signal G3(n) under a control of the $n^{th}$ stage scan signal G1(n). The repair line 12 intersects with the first control signal line 11. The repair line 12 and the first control signal line 11 are disposed in different layers. The repair line 12 is configured to transmit a $m^{th}$ stage scan signal G1 (m). Both of n and m are positive integers greater than 0, and n is greater than or equal to m.

In the embodiments of the disclosure, the gate driving circuit 100 including the multiple stages of gate driving units itself does not perform stage transmission, but is controlled by multiple groups of scan signals output by another group of GOA circuits to achieve the row by row opening of the gate driving circuit 100, thereby realizing the output of multiple groups of pulse signals. The above-mentioned another group of GOA circuits refer to other GOA circuits included in a display panel including the gate driving circuit 100 than the gate driving circuit 100, and are configured to provide multiple groups of scan signals required for an internal compensation circuit.

It should be noted that, for ease of description, in the following embodiments of the disclosure, when m is greater than n, the $m^{th}$ stage scan signal G1 (m) is represented by the $(n+k)^{th}$ stage scan signal G1 (n+k). When m is less than n, the $m^{th}$ stage scan signal G1 (m) is represented by the $(n-k)^{th}$ stage scan signal G1 (n−k). k is an integer greater than or equal to 1.

The $n^{th}$ stage scan signal G1(n), the $(n+k)^{th}$ stage scan signal G1 (n+k), and the $(n-k)^{th}$ stage scan signal G1 (n−k) can be scan signals output by the same GOA circuit. The repair line 12 can be connected to an output end of the GOA circuit to receive the $(n+k)^{th}$ stage scan signal G1 (n+k) and the $(n-k)^{th}$ stage scan signal G1 (n−k).

The k in the $(n+k)^{th}$ stage scan signal G1 (n+k) and the $(n-k)^{th}$ stage scan signal G1 (n−k) can be adjusted according to the driving requirements of the pixel circuit in the display panel. For example, when n is 3, k may be 1, 2, or the like; when n is 5, k may be 1, 2, 3, or the like.

It can be understood that when the gate driving circuit 100 is applied to the pixel circuit, the pixel circuit can accept a phase change of the $n^{th}$ pulse signal G3(n) within a certain range. Therefore, the value of k can be set according to simulation results of the pixel circuit. For example, when the $n^{th}$ stage scan signal G1(n) fails, the $(n-k)^{th}$ stage scan signal G1 (n−k) is used to repair the failed $n^{th}$ stage scan signal G1(n), then the phase of the $n^{th}$ pulse signal G3(n) is shifted forward by k stages, and a driving signal of the pixel circuit undergoes variation. The acceptable variation range of the pixel circuit needs to be determined based on the compensation effect and the display effect of the pixel circuit.

In the embodiments of the disclosure, with the design of the repair line 12, when the $n^{th}$ stage scan signal G1(n) fails, the repair line 12 can be connected to the first control signal line 11 by laser or other repair methods. Because the repair line 12 can provide the $(n-k)^{th}$ stage scan signal G1 (n−k) or the $(n+k)^{th}$ stage scan signal G1 (n+k), such as a $(n-1)^{th}$ stage scan signal G1 (n−1), a $(n+1)^{th}$ stage scan signal G1 (n+1), or the like, the $n^{th}$ stage pulse signal G3(n) can be output normally, thereby enhancing the independence of the gate driving circuit 100, and improving the yield of the gate driving circuit 100.

In some embodiments of the disclosure, the gate driving circuit 100 further includes a signal transmission line 13. The signal transmission line 13 is configured to transmit the $n^{th}$ stage scan signal G1(n). The signal transmission line 13 intersects with the first control signal line 11, and is disposed in different layers from the first control signal line 11. The signal transmission line 13 is connected to the first control signal line 11 through a via hole 130.

In some embodiments, the signal transmission line 13 may be disposed in the same layer as the repair line 12 to simplify the structure of film layers.

In some embodiments, the signal transmission line 13 may be disposed in the same layer as the first control signal line 11 to avoid poor signal transmission caused by the connection way through the via hole 130.

In some embodiments, when the $n^{th}$ stage scan signal G1(n) fails, and the repair line 12 is connected to the first control signal line 11, the connection between the signal transmission line 13 and the first control signal line 11 can be disconnected. Thus, it can be avoided that the failed $n^{th}$ stage scan signal G1(n) affects the normal operation of the $n^{th}$ stage gate driving unit 10.

In the embodiments of the disclosure, only one repair line 12 may be provided corresponding to the $n^{th}$ stage gate driving unit 10. Thus, when the $n^{th}$ stage scan signal G1(n) fails, the repair line 12 can be connected to the first control signal line 11 by laser or other repair methods. Because the repair line 12 can provide the $(n-k)^{th}$ stage scan signal G1 (n−k) or the $(n+k)^{th}$ stage scan signal G1 (n+k), the $n^{th}$ stage pulse signal G3(n) can be output normally. Moreover, the number of lines can be reduced to facilitate the implementation of a narrow frame.

In the embodiments of the disclosure, multiple repair lines 12 may be provided corresponding to the $n^{th}$ stage gate driving unit 10. It should be noted that when the $n^{th}$ stage scan signal G1(n) fails, only one of the repair lines 12 is selected to be connected to the first control signal line 11 by laser or other repair methods. The design of the multiple repair lines 12 can improve the repair yield.

As shown in FIG. 1, the repair line 12 includes at least one first repair line 121 and at least one second repair line 122. The first repair line 121 is configured to receive the $(n-k)^{th}$ stage scan signal G1 (n−k). The second repair line 122 is configured to receive the $(n+k)^{th}$ stage scan signal G1 (n+k).

For example, the repair line 12 may include k first repair lines 121 and k second repair lines 122. A first one of the first repair lines 121 is configured to receive a $(n-1)^{th}$ stage scan signal G1 (n−1). A second one of the first repair lines 121 is configured to receive a $(n-2)^{th}$ stage scan signal G1 (n−2). A kth one of the first repair lines 121 is configured to receive the $(n-k)^{th}$ stage scan signal G1 (n−k). A first one of the second repair lines 122 is configured to receive a $(n+1)^{th}$ stage scan signal G1 (n+1). A second one of the second repair lines 122 is configured to receive a $(n+2)^{th}$ stage scan signal G1 (n+2). The kth one of the second repair lines 122 is configured to receive the $(n+k)^{th}$ stage scan signal G1 (n+k). Analogously, here will not repeat them one by one. That is, both of the number of the first repair lines 121 or the number of the second repair lines 122 are k.

In some embodiments, the number of the first repair lines 121 or the number of the second repair lines 122 may not be k. That is, corresponding one of the first repair lines 121 may be configured to receive the appropriate $(n-k)^{th}$ stage scan signal G1 (n−k), and corresponding one of the second repair lines 122 may be configured to receive the appropriate $(n+k)^{th}$ stage scan signal G1 (n+k). The disclosure does not specifically limit on this.

By designing at least one first repair line 121 and at least one second repair line 122, both of the $(n-k)^{th}$ stage scan signal G1 (n−k) and the $(n+k)^{th}$ stage scan signal G1 (n+k) can serve as repair signals in the embodiments of the disclosure. Thus, in practice, an appropriate signal can be selected to repair the $n^{th}$ stage scan signal G1(n) based on the requirements of the pixel circuit, further improving the yield of the $n^{th}$ stage gate driving unit 10.

In some embodiments of the disclosure, the first repair line 121 and the second repair line 122 are disposed on two opposite sides of the first control signal line 11 respectively.

On the one hand, the space around the $n^{th}$ stage gate driving unit 10 can be fully utilized for wiring. On the other hand, the positions of the first repair line 121 and the second repair line 122 can be clearly distinguished, so that the $(n-k)^{th}$ stage scan signal G1 (n−k) or the $(n+k)^{th}$ stage scan signal G1 (n+k) can be selected as the repair signal according to actual requirements.

In some embodiments of the disclosure, a repair mark 120 is provided on the repair line 12. An intersection point A of the repair line 12 and the first control signal line 11 corresponds to the repair mark 120. Specifically, the intersection point A is set at least partially overlapping with the repair mark 120.

It is understood that the repair line 12 can be connected to the first control signal line 11 by a laser method. Because the energy of the laser is high, in order to avoid damage to other layers, the present disclosure is provided with the repair mark 120 on the repair line 12 and the intersection point A of the first control signal line 11 and the repair line 12 corresponding to the repair mark 120, which can improve the accuracy of the laser. While improving the yield of the connection between the repair line 12 and the first control signal line 11, the laser damage to other layers is avoided.

Further, the repair mark 120 may be a protrusion or groove disposed on the repair line 12. The repair mark 120 may be a graphical marker such as "−", "+", "×", or the like disposed on the repair line 12. This disclosure does not specifically limit on this.

Figure 2:
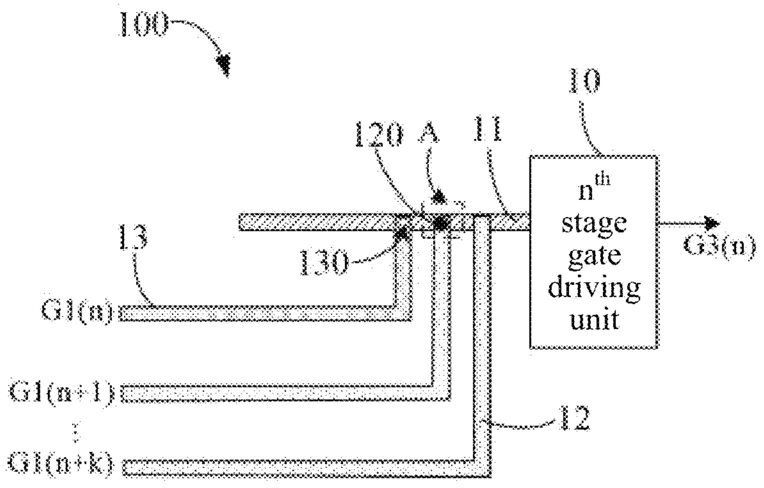
FIG. 2 is a second schematic structural diagram of a gate driving circuit according to one or more embodiments of the disclosure.

Referring to FIG. 2, it is a second schematic structural diagram of a gate driving circuit according to some embodiments of the disclosure. The structure in FIG. 2 differs from the gate driving circuit 100 shown in FIG. 1 in that the gate driving circuit 100 includes k repair lines 12, a first one of the repair lines 12 is configured to receive a $(n+1)^{th}$ stage scan signal G (n+1), and a kth one of the repair lines 12 is configured to receive a $(n+k)^{th}$ stage scan signal G1 (n+k).

It can be understood that k determines the phase relationship between the $n^{th}$ stage scan signal G1(n) and the $n^{th}$ stage pulse signal G3(n). The phase of the $n^{th}$ stage scan signal G1(n) and the phase of the $n^{th}$ stage pulse signal G3(n) are the same. When the $n^{th}$ stage scan signal G (n) fails, the $(n+k)^{th}$ stage scan signal G1 (n+k) can repair the failed $n^{th}$ stage scan signal G (n), then the phase of the $n^{th}$ stage pulse signal G3(n) is shifted backward by k stages. The embodiments of the disclosure can reduce the number of the repair lines 12, making the phase of the repaired $n^{th}$ stage pulse signal G3(n) shift backward by k stages, which can improve the consistency of the repair.

Further, the k repair lines 12 may be disposed on the same side of the first control signal line 11, or on two sides of the first control signal line 11. Specific design of the k repair lines 12 can be made based on the wiring space of the gate driving circuit 100.

Figure 3:
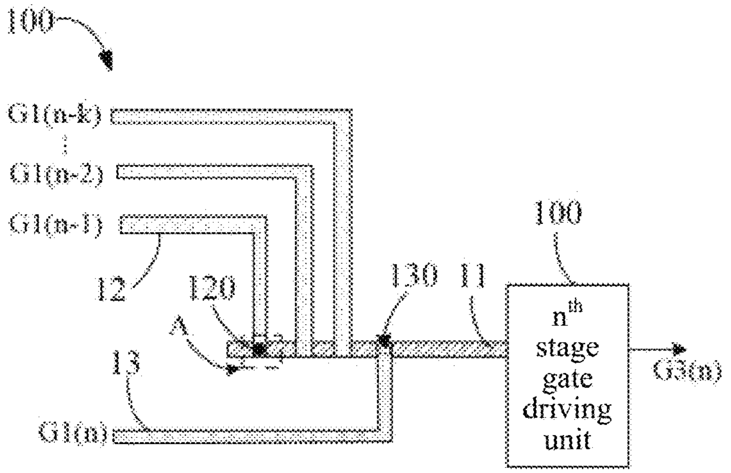
FIG. 3 is a third schematic structural diagram of a gate driving circuit according to one or more embodiments of the disclosure.

Referring to FIG. 3, it is a third schematic structural diagram of a gate driving circuit according to some embodiments of the disclosure. The structure in FIG. 3 differs from the gate driving circuit 100 shown in FIG. 1 in that the gate driving circuit 100 includes k repair lines 12, a first one of the repair lines 12 is configured to receive a $(n-1)^{th}$ stage scan signal G (n−1), and a kth one of the repair lines 12 is configured to receive the $(n-k)^{th}$ stage scan signal G1 (n−k).

Similarly, k determines the phase relationship between the $n^{th}$ stage scan signal G (n) and the $n^{th}$ stage pulse signal G3(n). The phase of the $n^{th}$ stage scan signal G (n) and the phase of the $n^{th}$ stage pulse signal G3(n) are the same. When the $n^{th}$ stage scan signal G (n) fails, the $(n-k)^{th}$ stage scan signal G1 (n−k) can repair the failed $n^{th}$ stage scan signal G (n), then the phase of the $n^{th}$ stage pulse signal G3(n) is shifted forward by k stages. The embodiments of the disclosure can reduce the number of the repair lines 12, making the phase of the repaired $n^{th}$ stage pulse signal G3(n) shift forward by k stages, which can improve the consistency of the repair.

It should be noted that in the $n^{th}$ stage gate driving unit 10, multiple stages of scan signals output by other GOA circuits may be required. Therefore, each group of the scan signals can be applied to the solutions described in the above-mentioned embodiments. That is, the $n^{th}$ stage gate driving unit 10 is not limited to be connected to the first control signal line 11, and/or the first control signal line 11 is not limited to receive the $n^{th}$ stage scan signal G (n).

Specifically, the following embodiments of the disclosure are illustrated by an example of a specific gate driving circuit 100, but cannot be understood as a limitation on the disclosure.

Figure 4:
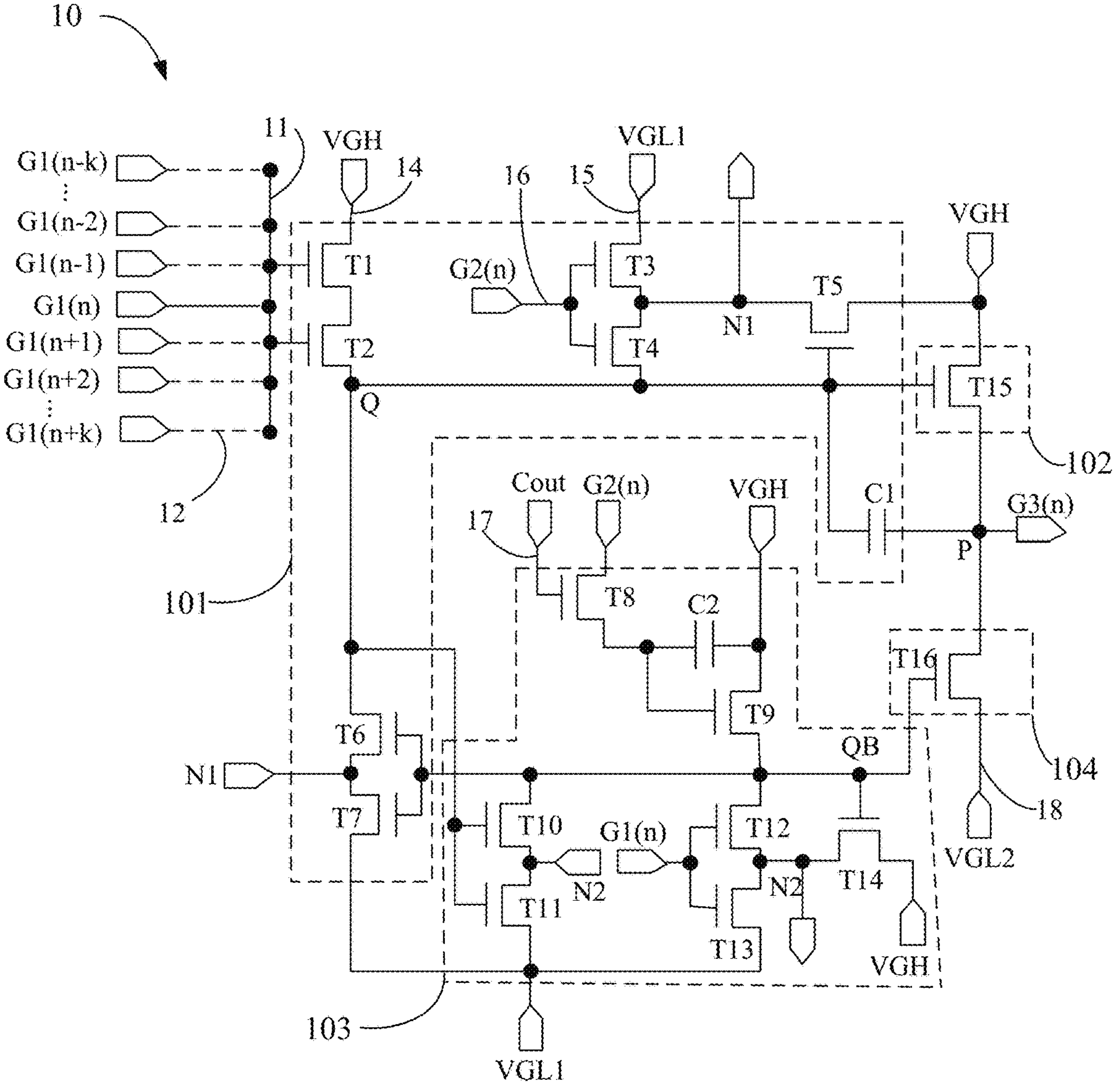
FIG. 4 is a schematic circuit diagram of a $n^{th}$ stage gate driving unit according to one or more embodiments of the disclosure.

Referring to FIG. 1 and FIG. 4, FIG. 4 is a schematic circuit diagram of the $n^{th}$ stage gate driving unit 10 according to some embodiments of the disclosure. In the embodiments of the disclosure, the $n^{th}$ stage gate driving unit 10 includes a pull-up control module 101, a pull-up output module 102, a pull-down control module 103, and a pull-down module 104.

The pull-up control module 101 is connected to a high-potential wiring 14, a first low-potential wiring 15, the first control signal line 11, a second control signal line 16, and a pull-up node Q. The pull-up control module 101 is configured to control a potential of the pull-up node Q.

The high-potential wiring 14 is configured to transmit a high-potential signal VGH. The first low-potential wiring 15 is configured to transmit a first low-potential signal VGL1. The second control signal line 16 is configured to transmit a second scan signal G2(n). The pull-up control module 101 is configured to pull up or pull down the potential of the pull-up node Q under a control of the $n^{th}$ stage scan signal G1(n), the high-potential signal VGH, the first low-potential signal VGL1, and the second scan signal G2(n).

The pull-up output module 102 is connected to the high-potential wiring 14, the pull-up node Q, and a signal output end P. The pull-up output module 102 is configured to output the $n^{th}$ stage pulse signal G3(n) at the signal output end P under the control of the potential of the pull-up node Q.

The pull-down control module 103 is connected to the high-potential wiring 14, the second control signal line 16, a stage transmission wiring 17, the pull-up node Q, the first low-potential wiring 15, and a pull-down node QB. The pull-down control module 103 is configured to control a potential of the pull-down node QB.

The stage transmission wiring 17 is configured to transmit a stage transmission signal Cout. The pull-down control module 103 is configured to pull up or pull down the potential of the pull-down node QB under the control of the high-potential signal VGH, the stage transmission signal Cout, and the second scan signal G2(n).

The pull-down module 104 is connected to a second low-potential wiring 18, the signal output end P, and the pull-down node QB. The pull-down module 104 is configured to pull down a potential of the signal output end P under the control of the potential of the pull-down node QB.

The second low-potential wiring 18 is configured to transmit a second low-potential signal VGL2. In the embodiments of the disclosure, a potential of the first low-potential signal VGL1 and a potential of the second low-potential signal VGL2 may be the same or different.

In the embodiments of the disclosure, the stage transmission signal Cout and the second scan signal G2(n) may come from other GOA circuits. Other signals in the gate driving circuit 100, other than the stage transmission signal Cout and the second scan signal G2(n), such as the high-potential signal VGH, the first low-potential signal VGL1, and the like, can be shared with other GOA circuits to reduce the wiring space, and realize the narrow frame.

The gate driving circuit 100 provided in the embodiments of the disclosure can control the output pulse width of the $n^{th}$ stage pulse signal G3(n) by controlling the phase difference between the $n^{th}$ stage scan signal G1(n) and the second scan signal G2(n), so as to meet the requirements in practice.

Specifically, in some embodiments of the disclosure, the pull-up control module 101 includes a first transistor T1, a second transistor T2, a third transistor T3, and a fourth transistor T4.

Both of a gate of the first transistor T1 and a gate of the second transistor T2 are connected to the first control signal line 11. A source of the first transistor T1 is connected to the high-potential wiring 14. A drain of the first transistor T1 is connected to a source of the second transistor T2. A drain of the second transistor T2 is connected to the pull-up node Q. Both of a gate of the third transistor T3 and a gate of the fourth transistor T4 are connected to the second control signal line 16. A source of the third transistor T3 is connected to the first low-potential wiring 15. A drain of the third transistor T3 and a source of the fourth transistor T4 are connected to a first node N1. A drain of the fourth transistor T4 is connected to the pull-up node Q.

It should be noted that the transistors used in all embodiments of the disclosure may be thin-film transistors, field-effect transistors, or other devices with the same characteristics. Because the source and the drain in each of the transistors are symmetrical, the source and the drain are interchangeable. In the embodiments of the disclosure, one of two poles other than the gate in each of the transistors is named the source, and the other of the two poles is named the drain, so as to distinguish from the gate. According to the pattern in the accompanying figures, a middle end of each of the transistors is the gate, a signal input end of each of the transistors is the source, and a signal output end of each of the transistors is the drain.

Further, the transistors used in embodiments of the disclosure may include P-type transistors and/or N-type transistors, in which the P-type transistor is configured to be turned on when the gate is in a low-level state, and turned off when the gate is in a high-level state, and in which the N-type transistor is configured to be turned on when the gate is in a high-level state, and turned off when the gate is in a low-level state. The transistors in the following embodiments of the disclosure are illustrated by an example of the N-type transistor, but cannot be understood as a limitation on the disclosure.

Further, in some embodiments of the disclosure, the pull-up control module 101 further includes a fifth transistor T5, a sixth transistor T6, a seventh transistor T7, and a first capacitor.

A gate of the fifth transistor T5, a drain of the sixth transistor T6, and one end of the first capacitor C1 are all connected to the pull-up node Q. A source of the fifth transistor T5 is connected to the high-potential wiring 14. A drain of the fifth transistor T5, a source of the sixth transistor T6, and a drain of the seventh transistor T7 are all connected to the first node N1. Both of a gate of the sixth transistor T6 and a gate of the seventh transistor T7 are connected to the pull-down node QB. A source of the seventh transistor T7 is connected to the first low-potential wiring 15. The other end of the first capacitor C1 is connected to the signal output end P.

It can be understood that the combination of the fifth transistor T5, the sixth transistor T6, the seventh transistor T7, and the first capacitor C1 can be used as an anti-leakage unit to prevent leakage of charge at the pull-up node Q. Specifically, when the potential of the pull-up node Q is pulled up, the fifth transistor T5 is turned on, and the high-potential signal VGH is transmitted to the first node N1, then the potential of the first node N1 is pulled up. At this time, the potential of the first node N1 is greater than or equal to the potential of the pull-up node Q. Thus, the leakage path of charge at the pull-up node Q through the fourth transistor T4 can be reduced or eliminated, making the high-potential state of the pull-up node Q sustain longer.

It can be understood that, in some embodiments, the sixth transistor T6 and the seventh transistor T7 in the pull-up control module 101 may be omitted.

In some embodiments of the disclosure, the pull-down control module 103 further includes an eighth transistor T8, a ninth transistor T9, and a second capacitor C2.

A gate of the eighth transistor T8 is connected to the stage transmission wiring 17. A source of the eighth transistor T8 is connected to the second control signal line 16. A drain of the eighth transistor T8, one end of the second capacitor C2, and a gate of the ninth transistor T9 are connected together. The other end of the second capacitor C2 and a source of the ninth transistor T9 are connected to the high-potential wiring 14. A drain of the ninth transistor T9 is connected to the pull-down node QB.

Further, in some embodiments of the disclosure, the pull-down control module 103 further includes a tenth transistor T10, an eleventh transistor T11, a twelfth transistor T12, a thirteenth transistor T13, and a fourteenth transistor T14.

Both of a gate of the tenth transistor T10 and a gate of the eleventh transistor T11 are connected to the pull-up node Q. A drain of the tenth transistor T10, a drain of the twelfth transistor T12, and a gate of the fourteenth transistor T14 are all connected to the pull-down node QB. A source of the tenth transistor T10, a drain of the eleventh transistor T11, a source of the twelfth transistor T12, a drain of the thirteenth transistor T13, and a drain of the fourteenth transistor T14 are all connected to a second node N2. Both of a source of the eleventh transistor T11 and a source of the thirteenth transistor T13 are connected to the first low-potential wiring 15. Both of a gate of the twelfth transistor T12 and a gate of the thirteenth transistor T13 are connected to the first control signal line 11. A source of the fourteenth transistor T14 is connected to the high-potential wiring 14.

The tenth transistor T10 and the eleventh transistor T11 can maintain the low-potential of the pull-down node QB. When the potential of the pull-up node Q is pulled up to a high-potential, the tenth transistor T10 and the eleventh transistor T11 are turned on, and the first low-potential signal VGL1 is transmitted to the pull-down node QB to maintain the low-potential of the pull-down node QB. Similarly, the twelfth transistor T12 and the thirteenth transistor T13 can also maintain the low-potential of the pull-down node QB. When the $n^{th}$ stage scan signal G1(n) is a high-potential signal, the twelfth transistor T12 and the thirteenth transistor T13 are turned on, and the first low-potential signal VGL1 is transmitted to the pull-down node QB to maintain the low-potential of the pull-down node QB.

Moreover, when the potential of the pull-down node QB is pulled up, the fourteenth transistor T14 is turned on, and the high-potential signal VGH is transmitted to the second node N2, then the potential of the second node N2 is pulled up. At this time, the potential of the second node N2 is greater than or equal to the potential of the pull-down node QB. Thus, the leakage path of charge at the pull-down node QB through the eleventh transistor T11 or the thirteenth transistor T13 can be reduced or eliminated, making the high-potential state of the pull-down node QB sustain longer.

It can be understood that, in some embodiments, the tenth transistor T10 and the eleventh transistor T11 in the pull-down control module 103 may be omitted, or the twelfth transistor T12 and the thirteenth transistor T13 in pull-down control module 103 may be omitted.

In some embodiments of the disclosure, the pull-up output module 102 may include a fifteenth transistor T15. A gate of the fifteenth transistor T15 is connected to the pull-up node Q. A source of the fifteenth transistor T15 is connected to the high-potential wiring 14. A drain of the fifteenth transistor T15 is connected to the signal output end P.

In some embodiments of the disclosure, the pull-down module 104 may include a sixteenth transistor T16. A gate of the sixteenth transistor T16 is connected to the pull-down node QB. A source of the sixteenth transistor T16 is connected to the second low-potential wiring 18. A drain of the sixteenth transistor T16 is connected to the signal output end P.

Figure 5:
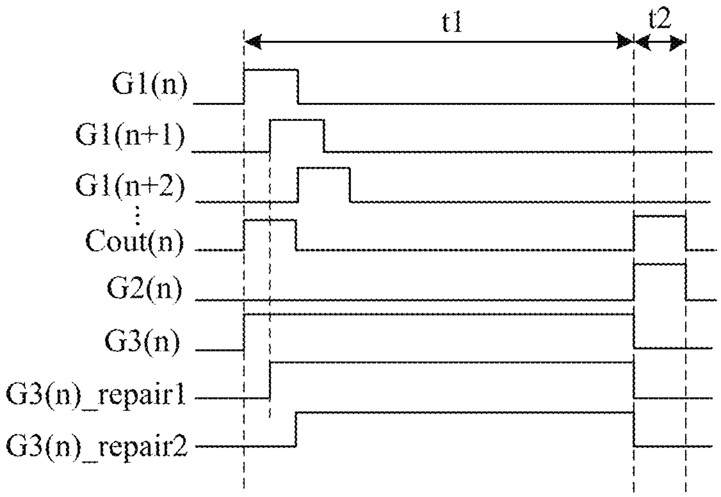
FIG. 5 is a signal timing sequence diagram of a $n^{th}$ stage gate driving unit according to one or more embodiments of the disclosure.

Referring to FIG. 4 and FIG. 5, FIG. 5 is a signal timing sequence diagram of the $n^{th}$ stage gate driving unit 10 according to some embodiments of the disclosure. In the embodiments of the disclosure, an operation timing sequence of the $n^{th}$ stage gate driving unit 10 may include a pulse output stage T1 and a reset stage T2.

At the pulse output stage t1: when the $n^{th}$ stage scan signal G1(n) is in a high-level state, the first transistor T1 and the second transistor T2 are turned on, and the pull-up node Q is charged to be in the high-level state. The fifteenth transistor T15, the fifth transistor T5, the tenth transistor T10, the eleventh transistor T11, the twelfth transistor T12, and the thirteenth transistor T13 are all turned on. At the same time, the stage transmission signal Cout is in the high-level state, and the second scan signal G2(n) is in a low-level state. Both of the third transistor T3 and the fourth transistor T4 are turned off. The gate of the ninth transistor T9 is discharged by the conductive eighth transistor T8 to be in the low-level state, and the pull-down node QB is fully discharged by the tenth transistor T10, the eleventh transistor T11, the twelfth transistor T12, and the thirteenth transistor T13 to be in the low-level state. The sixteenth transistor T16 is turned off, and the $n^{th}$ stage pulse signal G3(n) starts to output a high-level.

At the reset phase stage t2: when the second scan signal G2(n) is in a high-level state, the third transistor T3 and the fourth transistor T4 are turned on, and the pull-up node Q is discharged to be in a low-level state, making the fifteenth transistor T15, the tenth transistor T10, the eleventh transistor T11, the twelfth transistor T12, and the thirteenth transistor T13 being turn off. At the same time, since the stage transmission signal Cout is switched to be in the high-level state, the eighth transistor T8 is turned on, and the gate of the ninth transistor T9 is charged by the eighth transistor T8 in an open state to be in the high-level state, and the pull-down node QB is charged by the ninth transistor T9 to be in the high-level state. The sixteenth transistor T16 is turned on, and the $n^{th}$ stage pulse signal G3(n) starts to output a low-level.

It can be seen from the above-mentioned timing sequence that when the $n^{th}$ stage scan signal G1(n) is in the high-level state and the second scan signal G2(n) is in the low-level state, the potential of the pull-up node Q is pulled up, then the $n^{th}$ stage pulse signal G3(n) with high-level is output through the fifteenth transistor T15. When the $n^{th}$ stage scan signal G1(n) is in the low-level state and the second scan signal G2(n) is in the high-level state, the potential of the pull-down node QB is pulled up, and the $n^{th}$ stage pulse signal G3(n) is pulled down through the sixteenth transistor T16 to be in the low-level state. Therefore, the pulse width of the $n^{th}$ stage pulse signal G3(n) can be adjusted by controlling the phase difference between the $n^{th}$ stage scan signal G1(n) and the second scan signal G2(n). For example, as shown in FIG. 5, when the $(n+1)^{th}$ stage scan signal G1 (n+1) is provided by the repair line to replace the $n^{th}$ stage scan signal G1(n), the waveform of the repaired $n^{th}$ stage pulse signal is shown as G3(n)_repair1. When the $(n+2)^{th}$ stage scan signal G1 (n+2) is provided by the repair line to replace the $n^{th}$ stage scan signal G1(n), the waveform of the repaired $n^{th}$ stage pulse signal is shown as G3(n)_repair2.

Figure 6:
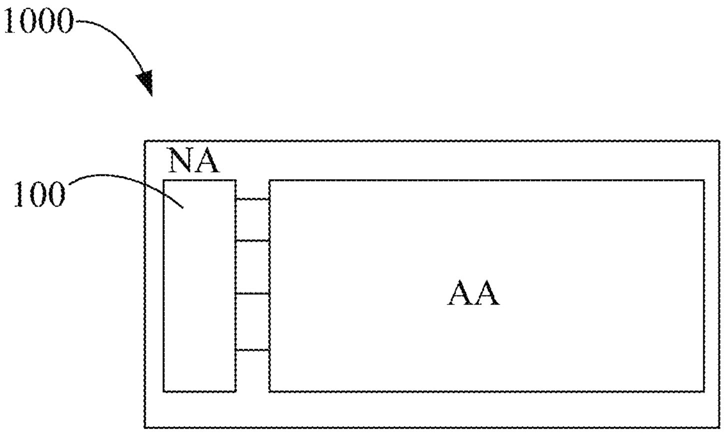
FIG. 6 is a schematic structural diagram of a display panel according to one or more embodiments of the disclosure.

Accordingly, referring to FIG. 6, some embodiments of the disclosure further provide a display panel 1000. The display panel 1000 includes a display area AA and a non-display area NA adjacent to the display area AA. The display panel 1000 includes any of the above-mentioned gate driving circuits 100 disposed in the non-display area NA.

The display panel 1000 further includes other GOA circuits (not shown in the figures) to provide multiple groups of scan signals required by the gate driving circuit 100, such as a $n^{th}$ stage scan signal, a second scan signal, or the like.

In the display panel 1000 provided by some embodiments of the disclosure, the gate driving circuit 100 includes the multiple stages of gate driving units and at least one repair line. In the embodiments of the disclosure, with the design of the repair line, because the repair line can provide the $m^{th}$ stage scan signal, the $n^{th}$ stage pulse signal can be output normally when the $n^{th}$ stage scan signal transmitted to the $n^{th}$ stage gate driving unit fails, thereby improving the yield of the gate driving circuit 100, and further improving the quality of the display panel 1000.

The above-mentioned embodiments of the disclosure are described in detail. Specific examples are applied herein to explain the principle and the embodiments of the disclosure, and the above-mentioned embodiments are only used to help understand the method and the core idea of the disclosure, and do not therefore limit a scope of the disclosure. Any equivalent structure or equivalent process transformation made using the contents of the description and drawings of the disclosure, or directly or indirectly applied in other related technical fields, shall be included in the scope of the protection of the disclosure.

What is claimed is:

1. A gate driving circuit comprising:

a plurality of stages of gate driving units, wherein a nth stage gate driving unit in the plurality of stages of gate driving units is connected to at least a first control signal line, and the first control signal line is configured to receive a nth stage scan signal; wherein the nth stage gate driving unit is configured to output a nth stage pulse signal under the control of the nth stage scan signal; and at least one repair line, wherein the repair line intersects with the first control signal line, and the repair line and the first control signal line are disposed in different layers; wherein the repair line is configured to transmit a mth stage scan signal, both of n and m are positive integers greater than 0, and n is greater than or less than m;

wherein a repair mark is provided on the repair line, and an intersection point of the repair line and the first control signal line corresponds to the repair mark.

2. The gate driving circuit of claim 1, further comprising a signal transmission line configured to transmit the nth stage scan signal, wherein the signal transmission line intersects with the first control signal line, and the signal transmission line and the first control signal line are disposed in different layers; and wherein the signal transmission line is connected to the first control signal line through a via hole.

3. The gate driving circuit of claim 1, wherein the gate driving circuit comprises k repair lines; wherein each of the k repair lines is configured to receive a corresponding mth stage scan signal, k is a positive integer greater than 1, and m is less than n.

4. The gate driving circuit of claim 1, wherein the gate driving circuit comprises k repair lines; wherein each of the k repair lines is configured to receive a corresponding mth stage scan signal, k is a positive integer greater than 1, and m is greater than n.

5. The gate driving circuit of claim 1, wherein the repair line comprises a first repair line and a second repair line; and wherein the first repair line is configured to receive the mth stage scan signal, and m is less than n; wherein the second repair line is configured to receive the mth stage scan signal, and m is greater than n.

6. The gate driving circuit of claim 5, wherein the first repair line and the second repair line are disposed on two sides of the first control signal line, respectively.

7. The gate driving circuit of claim 1, wherein the nth stage gate driving unit comprises:

a pull-up control module connected to a high-potential wiring, a first low-potential wiring, the first control signal line, a second control signal line, and a pull-up node, and configured to control a potential of the pull-up node;

a pull-up output module connected to the high-potential wiring, the pull-up node, and a signal output end, and configured to output the nth stage pulse signal at the signal output end under a control of the potential of the pull-up node;

a pull-down control module connected to the high-potential wiring, the second control signal line, a stage transmission wiring, the pull-up node, the first low-potential wiring, and a pull-down node, and configured to control a potential of the pull-down node; and a pull-down module connected to a second low-potential wiring, the signal output end, and the pull-down node, and configured to pull down a potential of the signal output end under a control of the potential of the pull-down node.

8. The gate driving circuit of claim 7, wherein the pull-up control module comprises a first transistor, a second transistor, a third transistor, and a fourth transistor; and wherein both of a gate of the first transistor and a gate of the second transistor are connected to the first control signal line, a source of the first transistor is connected to the high-potential wiring, a drain of the first transistor is connected to a source of the second transistor, and a drain of the second transistor is connected to the pull-up node; and wherein both of a gate of the third transistor and a gate of the fourth transistor are connected to the second control signal line, a source of the third transistor is connected to the first low-potential wiring, a drain of the third transistor and a source of the fourth transistor are connected to a first node, and a drain of the fourth transistor is connected to the pull-up node.

9. The gate driving circuit of claim 8, wherein the pull-up control module further comprises a fifth transistor, a sixth transistor, a seventh transistor, and a first capacitor; and wherein a gate of the fifth transistor, a drain of the sixth transistor, and an end of the first capacitor are all connected to the pull-up node, a source of the fifth transistor is connected to the high-potential wiring, a drain of the fifth transistor, a source of the sixth transistor, and a drain of the seventh transistor are all connected to the first node, both of a gate of the sixth transistor and a gate of the seventh transistor are connected to the pull-down node, and a source of the seventh transistor is connected to the first low-potential wiring; and wherein another end of the first capacitor is connected to the signal output end.

10. The gate driving circuit of claim 7, wherein the pull-down control module comprises an eighth transistor, a ninth transistor, and a second capacitor; and wherein a gate of the eighth transistor is connected to the stage transmission wiring, a source of the eighth transistor is connected to the second control signal line, a drain of the eighth transistor, an end of the second capacitor, and a gate of the ninth transistor are connected together, both of another end of the second capacitor and a source of the ninth transistor are connected to the high-potential wiring, and a drain of the ninth transistor is connected to the pull-down node.

11. The gate driving circuit of claim 10, wherein the pull-down control module further comprises a tenth transistor, an eleventh transistor, a twelfth transistor, a thirteenth transistor, and a fourteenth transistor; and wherein both of a gate of the tenth transistor and a gate of the eleventh transistor are connected to the pull-up node, a drain of the tenth transistor, a drain of the twelfth transistor, and a gate of the fourteenth transistor are all connected to the pull-down node, and a source of the tenth transistor, a drain of the eleventh transistor, a source of the twelfth transistor, a drain of the thirteenth transistor, and a drain of the fourteenth transistor are all connected to a second node; and wherein a source of the eleventh transistor and a source of the thirteenth transistor are connected to the first low-potential wiring, a gate of the twelfth transistor and a gate of the thirteenth transistor are connected to the first control signal line, and a source of the fourteenth transistor is connected to the high-potential wiring.

12. A display panel comprising a display area and a non-display area adjacent to the display area, wherein the display panel comprises a gate driving circuit disposed in the non-display area, and the gate driving circuit comprises:

a plurality of stages of gate driving units, wherein a nth stage gate driving unit in the plurality of stages of gate driving units is connected to at least a first control signal line, and the first control signal line is configured to receive a nth stage scan signal; wherein the nth stage gate driving unit is configured to output a nth stage pulse signal under the control of the nth stage scan signal; and at least one repair line, wherein the repair line intersects with the first control signal line, and the repair line and the first control signal line are disposed in different layers; wherein the repair line is configured to transmit a mth stage scan signal, both of n and m are positive integers greater than 0, and n is greater than or less than m;

wherein a repair mark is provided on the repair line, and an intersection point of the repair line and the first control signal line corresponds to the repair mark.

13. The display panel of claim 12, further comprising a signal transmission line configured to transmit the nth stage scan signal, wherein the signal transmission line intersects with the first control signal line, the signal transmission line and the first control signal line are disposed in different layers, and the signal transmission line is connected to the first control signal line through a via hole.

14. The display panel of claim 12, wherein the gate driving circuit comprises k repair lines; wherein each of the k repair lines is configured to receive a corresponding mth stage scan signal, k is a positive integer greater than 1, and m is less than n.

15. The display panel of claim 12, wherein the gate driving circuit comprises k repair lines; wherein each of the k repair lines is configured to receive a corresponding mth stage scan signal, k is a positive integer greater than 1, and m is greater than n.

16. The display panel of claim 12, wherein the repair line comprises a first repair line and a second repair line; and wherein the first repair line is configured to receive the mth stage scan signal, and m is less than n; wherein the second repair line is configured to receive the mth stage scan signal, and m is greater than n.

17. The display panel of claim 16, wherein the first repair line and the second repair line are disposed on two sides of the first control signal line, respectively.

18. The display panel of claim 12, wherein the nth stage gate driving unit comprises:

a pull-up control module connected to a high-potential wiring, a first low-potential wiring, the first control signal line, a second control signal line, and a pull-up node, and configured to control a potential of the pull-up node;

a pull-up output module connected to the high-potential wiring, the pull-up node, and a signal output end, and configured to output the nth stage pulse signal at the signal output end under a control of the potential of the pull-up node;

a pull-down control module connected to the high-potential wiring, the second control signal line, a stage transmission wiring, the pull-up node, the first low-potential wiring, and a pull-down node, and configured to control a potential of the pull-down node; and a pull-down module connected to a second low-potential wiring, the signal output end, and the pull-down node, and configured to pull down a potential of the signal output end under a control of the potential of the pull-down node.

19. A gate driving circuit comprising:

a plurality of stages of gate driving units, wherein a nth stage gate driving unit in the plurality of stages of gate driving units is connected to at least a first control signal line, and the first control signal line is configured to receive a nth stage scan signal; wherein the nth stage gate driving unit is configured to output a nth stage pulse signal under the control of the nth stage scan signal; and at least one repair line, wherein the repair line intersects with the first control signal line, and the repair line and the first control signal line are disposed in different layers; wherein the repair line is configured to transmit a mth stage scan signal, both of n and m are positive integers greater than 0, and n is greater than or less than m;

wherein the nth stage gate driving unit comprises:

a pull-up control module connected to a high-potential wiring, a first low-potential wiring, the first control signal line, a second control signal line, and a pull-up node, and configured to control a potential of the pull-up node;

a pull-up output module connected to the high-potential wiring, the pull-up node, and a signal output end, and configured to output the nth stage pulse signal at the signal output end under a control of the potential of the pull-up node;

a pull-down control module connected to the high-potential wiring, the second control signal line, a stage transmission wiring, the pull-up node, the first low-potential wiring, and a pull-down node, and configured to control a potential of the pull-down node; and a pull-down module connected to a second low-potential wiring, the signal output end, and the pull-down node, and configured to pull down a potential of the signal output end under a control of the potential of the pull-down node.

* * * * *